May 27, 1958 F. N. KAUFMAN 2,835,981
PIPE-MARKING DEVICE
Filed July 18, 1955
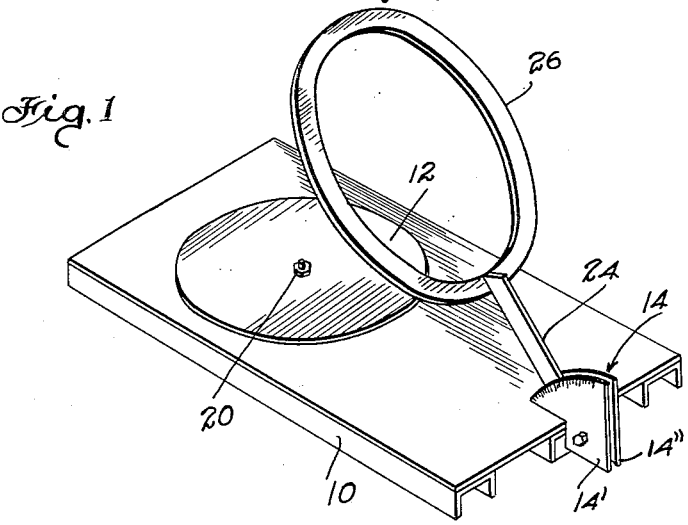
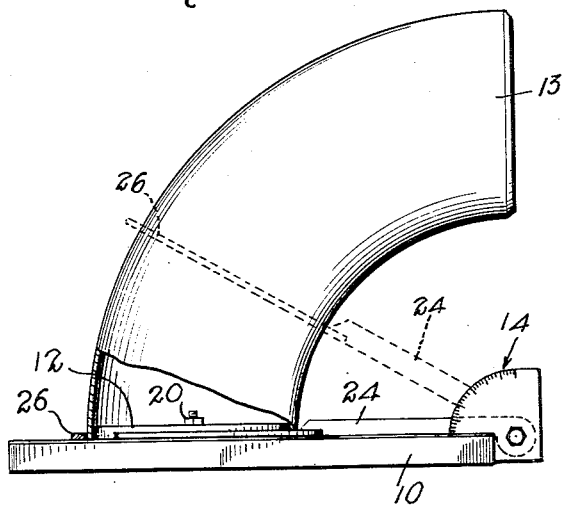
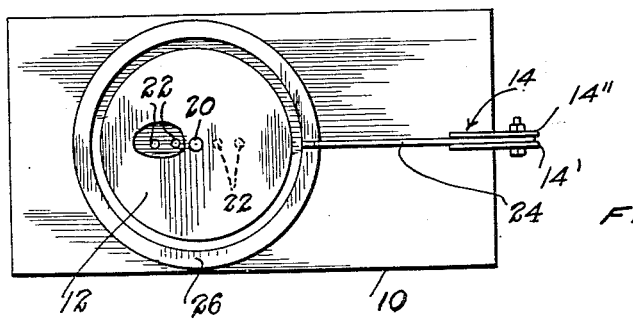
INVENTOR.
FRANK N. KAUFMAN
BY Lyon & Lyon
ATTORNEYS

United States Patent Office 2,835,981
Patented May 27, 1958

2,835,981

PIPE-MARKING DEVICE

Frank N. Kaufman, Lebec, Calif.

Application July 18, 1955, Serial No. 522,630

2 Claims. (Cl. 33—174)

This invention relates to pipe-marking devices and, more particularly, to an improved mechanism for marking a desired angle on curved pipe for which a cut is to be subsequently made.

In installing pipe in industrial locations, such as, for example, oil refineries, oil fields, and the like, it is often necessary to make bends, or turns, in the pipe, in order to accomplish desired pipeline runs. Usually, for the purpose of making these bends, a section of pipe, known as a pipe L is obtained. An L is usually a 90° sector of pipe which has the desired inner and outer dimensions. Quite often the turns required in the pipeline are less than 90° and, therefore, the L is cut to have the desired angle. Occasionally, the remainder of the cut L is thrown away as scrap, since it was difficult to measure or mark the remainder of the cut L.

It is quite difficult to scribe, or mark, a pipe to show how a desired angular cut is to be made. With 90° sectors, apparatus has been devised for accomplishing this. This is shown, for example, in Patent No. 2,464,444 to Gantz. However, for less than 90° sectors, no mechanism has been devised which can be conveniently utilized.

An object of the invention is to provide a novel, simple, and useful pipe angle-marking apparatus.

Another object of the invention is to provide a novel apparatus for marking desired angles for pipe cuts.

Still another object of the present invention is the provision of novel and useful apparatus for marking pipes which can be employed for marking any curved sector of pipe.

These and other objects of the invention are achieved by employing a base plate upon which the pipe to be marked is positioned. In order to properly position the pipe, a pipe-positioning plate is fastened to the base plate. This positioning plate has a diameter which enables a pipe to be positioned over the plate. At one end of the base plate an angle scale is attached which has graduations in angles marked thereon. A marking member is pivotally supported from the vertex of the angles of said angle scale. This marking member includes a ring having a diameter sufficiently large to fit over the outside of the pipe which is to be marked. A rodlike support is provided for the ring, which holds the ring so that its center can coincide with the center of the pipe-positioning plate and the ring can describe an arc which is coextensive with the curve of the pipe to be cut. The ring also serves to accurately position the sector of pipe for the purposes of measuring a desired angle. The ring is elevated until the desired angle with the base plate is indicated by its support at the angle-measuring scale. Chalk or any other scribing means may be employed to mark the pipe. The pipe is scribed at the position of the ring and the cut is then subsequently made at the marked position.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a perspective view of the embodiment of the invention;

Figure 2 is a view in elevation of the embodiment of the invention showing a pipe in position thereon; and Figure 3 is a plan view of the embodiment of the invention.

Figure 1 shows in perspective the embodiment of the invention. It comprises a base plate 10, a pipe-locating member 12, an angle-measuring scale 14, and a marking member 26. The pipe-locating member is removably attached to the base plate by a screw and nut 20, as may be seen in Figure 1 or Figure 3. A series of holes 22 along a straight line which extends to the angle scale vertex affords different mounting positions for a pipe-positioning plate. These may be seen in Figure 3. The purpose for these holes will be described later.

The pipe-locating member has a diameter which enables a pipe on which a mark is desired to be made to be inserted thereon. In other words, its diameter is somewhat less than the inner diameter of the pipe. The angle-measuring scale actually comprises two scales 14', 14", as may be seen in Figure 3. These are both fixedly mounted in the base plate at right angles thereto and are spaced apart to permit the insertion therebetween of a support member 24. This support member is supported rotatably at the vertex of the angles on the angle scales and has attached to the other end a ring member 26. This ring member, which may be alternatively identified as ring-marking means or a marking ring, has an inner diameter which is in excess, or slightly larger, than the outer diameter of a pipe to be marked to enable the ring to pass over it without interference.

As shown in Figure 2, the pipe is positioned on the pipe-positioning plate member. The support member extending from the vertex of the angles and between the two angle scales indicates the angle of the ring with the base plate. The ring serves to line up the pipe so that its curvature is coincident with an arc described by the ring as it is rotated about the vertex of the angles on the angle-measuring scale. Accordingly, the angle indicated on the scale graduations is the angle made by the ring with the base plate. Any desired marking tool can be used to trace the ring position on the pipe, which can then be clamped and cut at the mark.

It will be appreciated that the pipe sector need not be any specific angle, such as 90°, in order that a desired angle of cut be marked thereon. All that is required is that the pipe have one flat face, to enable its being positioned on the base plate.

In order to handle pipes of different diameters and different radii of curvature, various plate-positioning members may be employed. Also, different marking members may be employed. To accomplish this, it is to be noted that the ring support is fastened to the vertex of the angle scale by a nut and bolt, which can be readily separated. This permits substitution of different marking rings having different diameters, as well as being differently spaced from the vertex, as is required for different sizes and curved pipes. The different holes in the base plate enable differently sized and spaced pipe-positioning plates to be employed to achieve the proper positioning of the various size pipes for which cuts are desired—also, for pipes having different radii.

It should be appreciated that the device shown is an extremely simple, yet novel, arrangement for enabling cuts of almost any desired angle to be made on pipe sectors which are curved. While one embodiment of the invention is shown and described herein, it will be appreciated by those skilled in the art that other arrange-

I claim:

1. A mechanism for enabling the marking of angles on curved pipe and the like comprising a base plate, a pipe-positioning plate removably attached to said base plate, said pipe-positioning plate being adapted to fit inside a curved pipe to be marked, an angle scale mounted at one end of said base plate, at right angles thereto and on a line parallel to a diameter of said pipe-positioning plate, and a marking member including a marking ring adapted to fit over a curved pipe to be marked, and rod means to pivotally support said ring from the vertex of the angles on said angle scale and at a distance therefrom to have the center of said ring describe a curve with the distance between the center of said pipe-positioning plate and said vertex as a radius.

2. A mechanism as recited in claim 1 wherein said angle scale includes a pair of spaced scales, and said rod means extends from said vertex between said spaced scales as an indicator of the angle made by said marking ring with said base plate.

References Cited in the file of this patent

UNITED STATES PATENTS

| | | |
|---|---|---|
| 279,336 | Clark | June 12, 1883 |
| 2,464,444 | Gantz | Mar. 15, 1949 |
| 2,611,183 | Thrower | Sept. 23, 1952 |
| 2,652,243 | Reed | Sept. 15, 1953 |
| 2,805,057 | Bain | Sept. 3, 1957 |